United States Patent Office 3,144,913
Patented Aug. 18, 1964

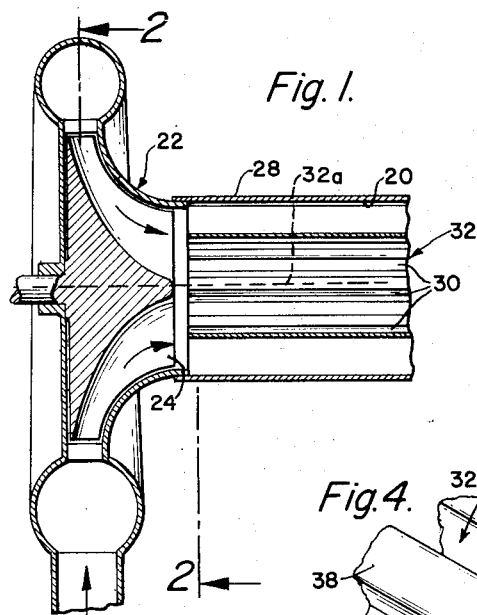
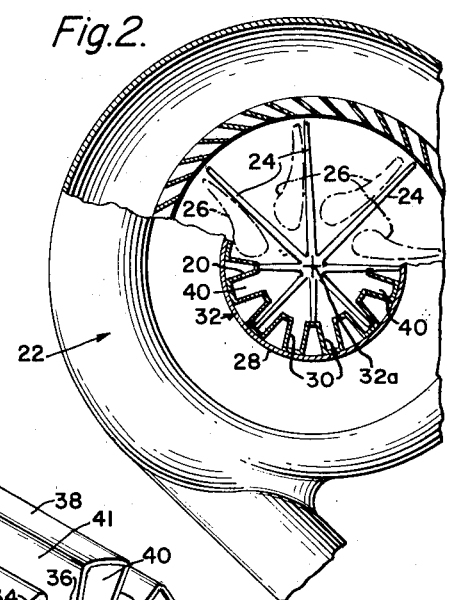
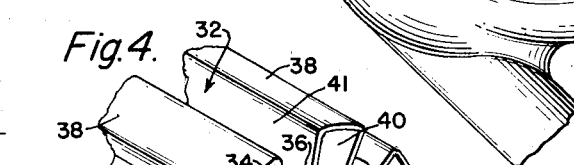
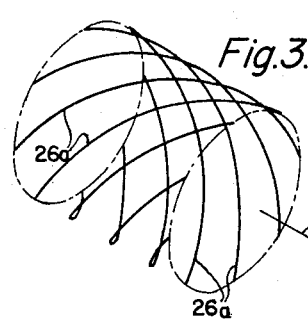
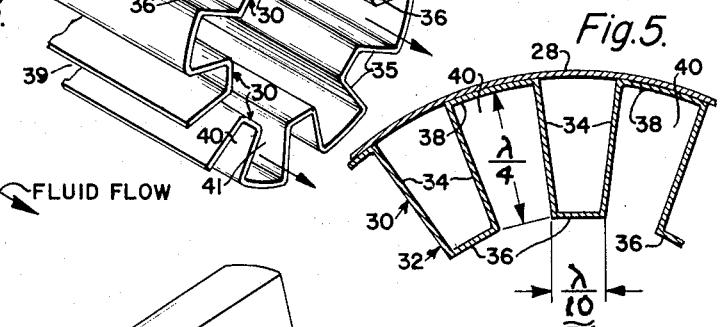
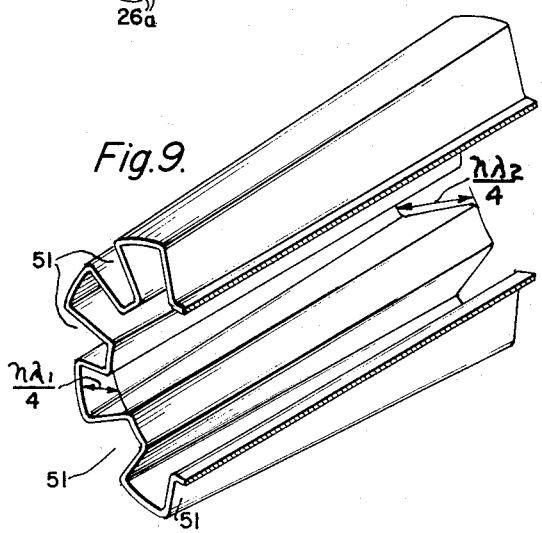
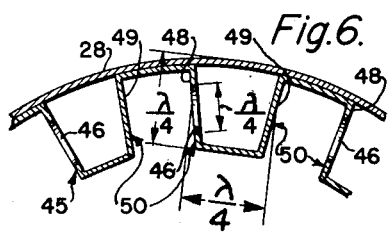

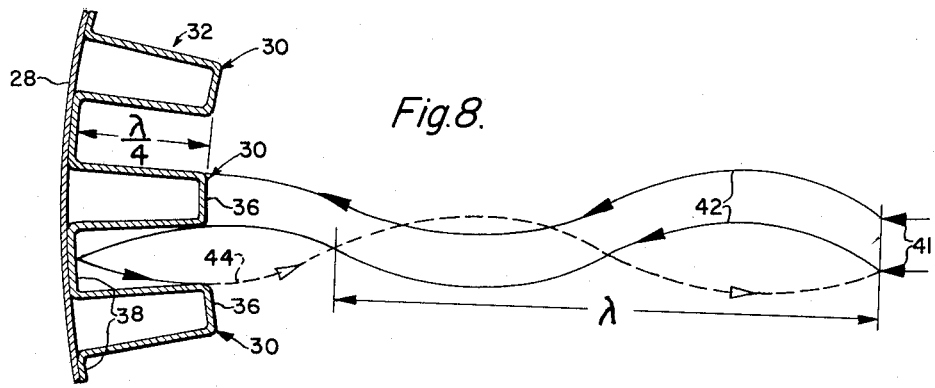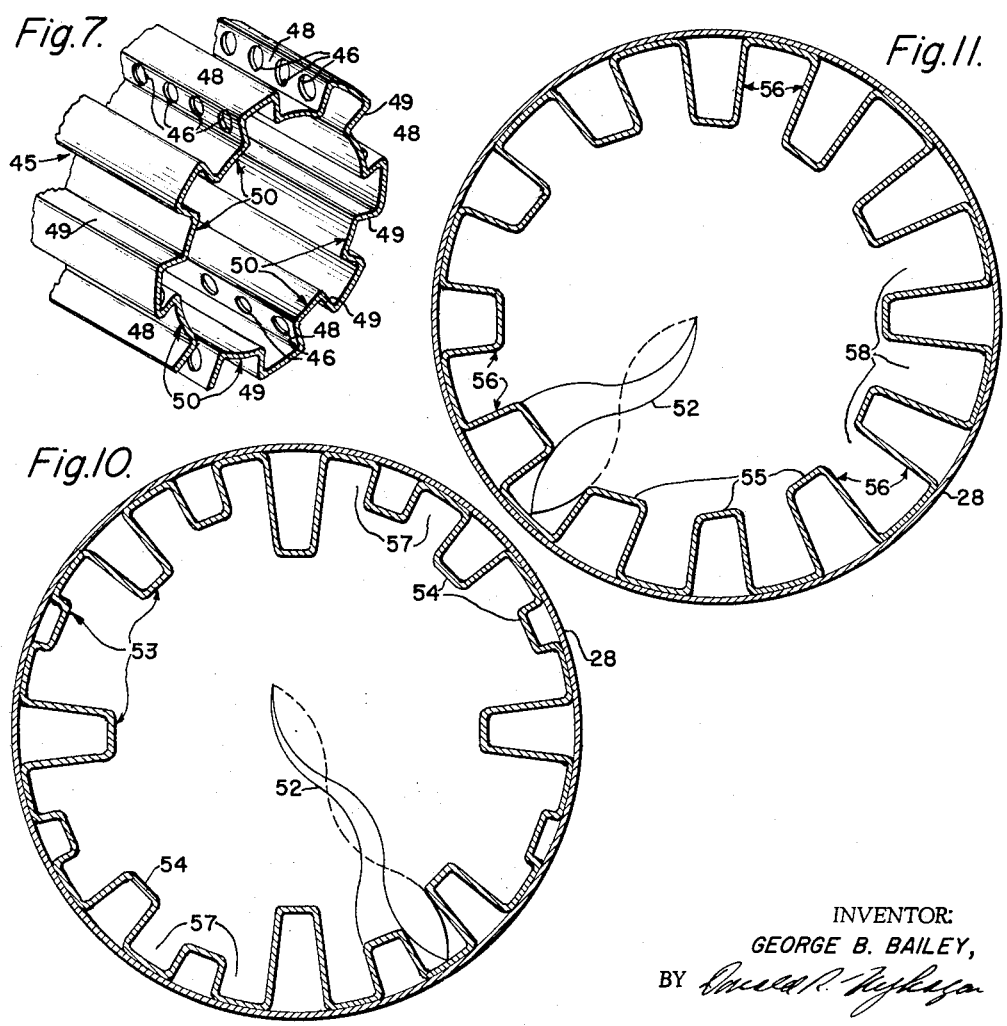

3,144,913
METHOD AND APPARATUS FOR ATTENUATING HELICAL ACOUSTIC PRESSURE WAVES
George B. Bailey, Redondo Beach, Calif., assignor to The Garrett Corporation, Los Angeles, Calif., a corporation of California
Continuation of application Ser. No. 763,273, Sept. 25, 1958. This application Aug. 31, 1962, Ser. No. 220,675
10 Claims. (Cl. 181—46)

This invention relates generally to methods of and apparatus for attenuating acoustic pressure waves propagated through a fluid medium. The invention relates more particularly to methods of attenuating the acoustic pressure waves contained in the exhaust streams from certain kinds of high speed rotary fluid machines and to acoustic attenuators for use on such machines.

This application is a continuation of my copending application, Serial Number 763,273 now abandoned, filed September 25, 1958 and entitled Sound Attenuator.

High speed rotary fluid machines such as turbines, turbocompressors, fans, and the like, are required to operate with high aerodynamic blade loading in order to attain maximum efficiency. This high blade loading creates high pressure areas adjacent the rotor blades of such a machine and from these high pressure areas are propagated acoustic pressure waves which travel through the high velocity exhaust stream of the machine. The acoustic pressure waves thus created expand axially and radially through the fluid medium of the exhaust stream. The angular velocity of the rotating high pressure areas and the linear velocity of the exhaust stream impart to the acoustic pressure waves additional circumferential and axial velocity components. As a consequence of these various velocity components of the acoustic pressure waves, there is produced in the exhaust stream, a radially expanding, axially advancing, helical acoustic wave pattern.

At the normal operating speeds of rotary fluid machines of the character described, the repetition rates or frequencies contained in this acoustic wave pattern include a narrow high frequency band in the upper audio frequency range. As a result, these machines generate an intense sound which is highly irritating and objectionable as well as often painful to the human ear.

Many and varied acoustic attenuation methods and devices have been devised for attenuating acoustic pressure waves propagated through a fluid medium. One of the most common acoustic attenuators for use in a fluid duct, for example, is a muffler which attenuates acoustic energy by absorption. Such mufflers, however, are bulky, costly, and produce pressure losses which cannot be tolerated in fluid machines of the kind mentioned above.

A general object of the present invention is to provide improved acoustic attenuation methods and acoustic attenuators for attenuating the acoustic pressure waves contained in the exhaust streams from fluid machines of the character described.

A more specific object of the invention is to provide acoustic attentuation methods and acoustic attenuators of the character described which attenuate by an acoustic pressure wave cancellation action and create minimum pressure loss.

Another object of the invention is to provide acoustic attenuation methods and acoustic attenuators of the character described which can be designed to attenuate either a selected frequency or a selected band of frequencies.

A further object of the invention is to provide acoustic attenuation methods and acoustic attenuators of the character described which are relatively simple, economical, and otherwise ideally suited to their intended purposes.

Briefly, the objects of the invention are attained by directing the high velocity exhaust stream from a rotary fluid machine of the character described through an acoustic attenuator wherein the circumferential pressure waves and/or the radial pressure waves contained in the radially expanding, axially advancing helical acoustic pressure wave pattern which is propagated through the exhaust stream are attenuated by a pressure wave cancellation action. Thus, the acoustic attenuators of the invention are provided with internal reflection surfaces for the pressure waves which are so arranged that 180° phase reversal occurs between successive circumferential increments of the reflected circumferential pressure waves and/or between successive circumferential increments of the reflected radial pressure waves. A pressure wave cancellation action thus occurs between successive increments of the reflected circumferential pressure waves and/or the radial pressure waves which effectively attenuates the acoustic pressure wave pattern in the exhaust stream.

According to the invention the acoustic attenuation methods and acoustic attenuators may be designed to attenuate primarily a single frequency or a selected band of frequencies. An operational advantage of the present attenuators is that they are so arranged as to present minimum obstruction to and, therefore, minimum pressure loss in the exhaust stream in which the attenuators operate.

The invention will be better understood from the following detailed description taken in connection with attached drawings, wherein:

FIG. 1 is a longitudinal section through an acoustic attenuator constructed in accordance with the invention and installed in the exhaust duct of high speed rotary fluid machine of the character described;

FIG. 2 is an enlarged section taken on line 2—2 in FIG. 1;

FIG. 3 is a graphical illustration of the helical acoustic pressure wave pattern contained in the high velocity exhaust stream from the machine in FIG. 1;

FIG. 4 is an enlarged perspective of a portion of the acoustic attenuator illustrated in FIGS. 1 and 2;

FIG. 5 is an enlarged transverse section through a portion of the exhaust duct and acoustic attenuator in FIGS. 1 and 2;

FIG. 6 is a transverse section through an exhaust duct containing a modified acoustic attenuator according to the invention;

FIG. 7 is a perspective view of a portion of the acoustic attenuator in FIG. 6;

FIG. 8 graphically illustrates the radial pressure wave cancellation action which occurs in the present acoustic attenuation methods and acoustic attenuators;

FIG. 9 is a perspective view of a modified acoustic attenuator according to the invention;

FIG. 10 is a transverse section through an exhaust duct containing a further modified acoustic attenuator according to the invention; and FIG. 11 is a view similar to FIG. 10 illustrating yet a further modified acoustic attenuator according to the invention.

Referring now to FIGS. 1–5 of these drawings, there is shown a centripetal turbine 22 having a rotor with blades 24. During operation of the turbine, the high velocity turbine exhaust stream is discharged via a passage 20 in the turbine exhaust duct 28. When the turbine is operating at normal speed, the blades 24 are subjected to high aerodynamic loading which produces high pressure areas in the turbine exhaust fluid at positions adjacent the turbine blades 24. These high pressure areas have been graphically illustrated in phantom lines at 26 in FIG. 2. As mentioned earlier, turbine operation with such high blade loading is required for maximum efficiency.

The high pressure areas 26 propagate acoustic pressure waves 26a through the fluid medium of the exhaust stream discharging from the turbine through its exhaust duct 28. These pressure waves inherently expand or travel radially and axially through the fluid medium of the exhaust stream flowing through the duct. Rotation of the high pressure areas 26 with the turbine rotor imparts a further circumferential velocity component to the pressure waves with respect to the exhaust duct while the velocity of the exhaust stream imparts a further axial velocity component to the pressure waves. As a consequence of these various velocity components of the pressure waves, there is established within the exhaust duct 28 a radially expanding, axially advancing, generally helical acoustic pressure wave pattern. FIG. 3 graphically illustrates this wave pattern.

Located within the turbine exhaust duct 28 is a generally tubular acoustic attenuator or baffle structure 32 constructed in accordance with the invention which is effective to attenuate a selected frequency of the radial pressure wave components, or simply radial pressure waves, contained in the helical acoustic wave pattern generated by turbine 22. Attenuator 32 is fixed in any convenient way within the turbine exhaust duct 28 so that the central axis 32a of the attenuator substantially coincides with the central axis of the exhaust duct. For example, the attenuator may be frictionally held within or welded to the exhaust duct. Attenuator 32 comprises a series of circumferentially spaced, radial baffles 30 extending axially of the duct. Each baffle has side walls 34 disposed approximately in radial planes of the exhaust duct and inner edge walls 36 joining the radially inner edges of the baffle side walls. The radially outer edges of the adjacent baffles 30 are joined by outer walls 38. Between each pair of adjacent baffles is a space 40. Between the side walls of each baffle is a space 41.

In the attenuator 32 under discussion, the baffles 30 are of uniform size and spacing, and the width of the inner baffle walls 36 is substantially equal to the width of the baffle interspaces 40 at the radially inner open sides of these interspaces.

Attenuator 32 can, of course, be fabricated in various ways. Preferably, however, the attenuator is made by stamping or otherwise forming a sheet of metal to provide the baffles 30 after which the baffled sheet is coiled and inserted axially into the turbine exhaust duct 28. The metal sheet is preferably so dimensioned and so arranged during the forming operation that the edge portions of the sheet form the side walls of two adjacent attenuator baffles 30 and the spacing 39 (FIG. 4) between these edge portions, when the sheet is coiled, is the same as the spacing 40 between the remaining baffles.

Any metal suitable for exhaust ducting, e.g. stainless steel or aluminized steel, may be used for the attenuator. The gauge of the metal may be varied as necessary to achieve proper forming and coiling of the attenuator consistent, of course, with the strength and other structural requirements for each particular attenuator installation. In some cases, the attenuator 32 may be inserted into the existing exhaust duct 28 of a turbine or other fluid machine while in other cases, the duct may be made as an integral part of the attenuator for installation on fluid machines not having a separate exhaust duct.

During operation of turbine 22, the high velocity turbine exhaust stream, containing the radially expanding, axially advancing acoustic pressure wave pattern of FIG. 3, flows through the baffled central opening in the attenuator 32 as well as through the baffles 30 themselves which are preferably left open at their ends for this purpose. The attenuator 32 thus presents a minimum obstruction to, and, therefore, a minimum pressure loss in, the turbine exhaust stream. In some cases, however, the baffles may be solid.

As discussed earlier, the helical wave pattern in the exhaust stream contains a narrow high frequency band in the upper audio range. In the ensuing discussion, the character $\lambda m$ denotes the wavelength of the mean frequency of this frequency band. Shown in FIG. 8, are radial pressure waves 42 of this helical wave pattern emanating from a source 41 in the fluid medium of the turbine exhaust stream and expanding or traveling radially out toward the baffled wall of attenuator 32. From this illustration, it is seen that alternate annular or circumferential increments of the radial pressure waves impinge the inner edge faces or walls 36 of the attenuator baffles 30 and are reflected back. The intervening annular or circumferential increments of the radial pressure waves pass through the baffle interspaces 40 to the outer baffle walls 38 and are then reflected back.

It is evident from FIG. 8 that the radial pressure waves 42 arrive in phase at the inner baffle walls 36 and the radially inner open sides of the baffle interspaces. Because of the time required for the radial wave entering the space 40 to travel from the inner open side of this space to the outer baffle wall 38 and then back to the open side of the space, however, the reflected radial pressure wave 44 emerging through the inner open side of the baffle interspace 40 is delayed, i.e., its phase is shifted, with respect to the radial pressure wave reflected from the inner baffle wall 36.

According to the present invention, the radial depth of the baffle interspaces 40 is made equal to $\lambda m/4$, that is one-fourth of the wavelength of the mean acoustic frequency to be attenuated, or to some other odd multiple of this quarter wavelength, i.e. $n\lambda m/4$ where $n$ is an odd integer. Consequently, the reflected radial pressure wave 44 is shifted in phase 180° with respect to the radial pressure wave reflected from the inner baffle wall 36. This 180° phase reversal of the reflected radial pressure waves produces cancellation between the out-of-phase wave portions. The reflected pressure wave 44 is continued in dotted lines in FIG. 8, however, to make the phase reversal apparent.

Because of the fact that the width of the inner baffle walls 36 and the width of the radially inner open sides of the baffle interspaces 40 are substantially equal, the total radial acoustic energy reflected from all the baffle walls 36 is substantially equal to the total radial acoustic energy reflected from all the outer attenuator walls 38. Maximum cancellation of the mean frequency of the radial acoustic energy to be attenuated is thereby attained. Preferably, the width of each baffle wall 36 and baffle interspace 40 is equal to one-tenth of the wavelength of the mean frequency, i.e. $\lambda m/10$.

Reference is now made to the acoustic attenuator 45 of FIGS. 6 and 7 which is identical to the attenuator 32 discussed above except that apertures 46 are provided in one side wall 48 of each attenuator baffle 50 and the width of each baffle, measured between the center of each aperture and the opposing baffle wall 49, is equal to one-fourth the wavelength of the mean frequency to be attenuated, i.e. $\lambda m/4$, as shown in FIG. 6, or to some other odd multiple of this quarter wavelength, i.e. $n\lambda m/4$. The baffle side walls to be apertured are determined as follows.

During operation of the acoustic attenuator 45 in the exhaust stream of turbine 22 or other rotary fluid machine of the character described, the circumferential pressure wave components, or simply the circumferential pressure waves, of the helical acoustic wave pattern existing in the exhaust stream travel in one direction of rotation or the other with respect to the attenuator 45, depending upon the direction of rotation of the turbine rotor. As a consequence of this relative rotation of the circumferential pressure waves, the latter impinge those baffle side walls 48 which face in the opposite direction of rotation. It is these latter side walls which are formed with the apertures 46. The apertures are preferably so dimensioned that they occupy approximately one half of the total area of their respective baffle side walls.

In operation of the turbine 22 or other rotary fluid machine with the acoustic attenuator 45 installed in its exhaust duct, the latter attenuator attenuates the mean frequency of the radial pressure waves in precisely the same way as the attenuator 32 first described. In addition, however, alternate circumferential increments of the circumferential pressure waves arriving at each apertured baffle side wall 48 impinge the respective side wall and are reflected back while the intervening circumferential pressure wave increments pass through the apertures 46 in the respective baffle side wall to the respective opposing baffle side wall 49 and are then reflected back through the apertures. Because of the $\lambda m/4$ circumferential width of each baffle 50, the pressure waves, which pass through the baffle apertures 46 undergo a 180° phase reversal with respect to the pressure waves reflected from the apertured baffle walls 48. Consequently, a pressure wave cancellation similar to that described earlier occurs between the reflected circumferential pressure wave increments emerging through the baffle apertures 46 and the circumferential pressure wave increments reflected from the apertured walls themselves.

Since the total area of the apertures 46 is approximately equal to the total unapertured area of the apertured baffle walls 48, the reflected, out-of-phase, circumferential acoustic energies are substantially equal, whereby maximum acoustic energy cancellation is achieved, as before. Thus, additional cancellation or attenuation of the total acoustic energy present in the helical wave pattern produced by the turbine 22, or other rotary fluid machine, is attained by the acoustic attenuator of FIGS. 6 and 7.

It should be noted that the $\lambda m/10$ circumferential width dimension of the inner baffle walls and baffle interspaces mentioned in connection with the attenuator 32 of FIGS. 1–5 is not necessarily inconsistent with the $\lambda m/4$ baffle side wall spacing in the embodiment of FIGS. 6 and 7 since the baffles taper to a narrower width at their radially inner edges. In any event the $\lambda m/10$ baffle and interspace dimension is secondary to the other attenuator dimensions including, in the present instance, the $\lambda m/4$ spacing between the baffle side walls 48, 49.

FIG. 9 illustrates an acoustic attenuator which is identical to the acoustic attenuator 32 of FIGS. 1–5 except that the baffles 51 of the attenuator in FIG. 9 taper in the axial direction of the attenuator; that is to say, the radial dimension of each baffle 51 and baffle interspace increases toward one end of the attenuator. This latter attenuator is designed to effect a pressure wave cancellation action, i.e., attenuate, over a range or band of frequencies. To this end, the radial dimension of the attenuator baffles 51 and baffle interspaces ranges from a minimum of $n\lambda 1/4$ at one end of a maximum of $n\lambda 2/4$ at the other end where $\lambda 1$ is the wavelength of the lower frequency of the frequency band to be attenuated, $\lambda 2$ is the wavelength of the upper frequency of this band, and $n$ is an odd integer as before.

From this description of the acoustic attenuator in FIG. 9, it is evident that when the latter is installed in the exhaust duct of a turbine or other high speed rotary fluid machine of the character described, the radial pressure waves of the helical acoustic pressure wave pattern contained in the exhaust stream flowing through the duct are attenuated by a pressure wave cancellation action essentially identical to that described earlier. In the case of the acoustic attenuator of FIG. 9, however, the frequency which is attenuated increases progressively from one end of the attenuator to the other, whereby attenuation of the radial pressure waves over the band of frequencies varying in wavelength from $\lambda 1$ to $\lambda 2$ is accomplished.

FIGS. 10 and 11 illustrate alternative ways of accomplishing a radial pressure wave cancellation action, or attenuation, over a band of frequencies. In both illustrated forms of the invention, this is accomplished by making the attenuator baffles (and therefore the baffle interspaces) of different radial dimensions each equal to $n\lambda/4$ where $\lambda$ is the wavelength of a selected frequency to be attenuated at the respective baffle and adjacent interspace. In FIG. 10, the baffles 53 of different radial height are distributed around the attenuator whereas in FIG. 11, the baffles 56 are arranged in order of progressively varying radial height.

In both of the attenuator embodiments of FIGS. 10 and 11, the width of the inner baffle walls 54 (FIG. 10) and 55 (FIG. 11) are made substantially equal to the radially inner open sides of the respective adjacent baffle interspaces 57 (FIG. 10) and 58 (FIG. 11) whereby maximum radial pressure wave cancellation or attenuation is achieved for the reasons explained earlier. The progressive baffle arrangement of FIG. 11 provides a more uniform distribution of the attenuated frequencies around the attenuator.

In operation of the acoustic attenuators of FIGS. 10 and 11, attenuation of the radial pressure waves 52 reflected from each inner baffle wall and the outer wall of the adjacent baffle interspaces occurs, obviously, at a frequency having a wavelength which is $4/n$ times the radial dimension of the respective baffle and interspace. Attenuation over a range or band of frequencies is, therefore, accomplished by each of the acoustic attenuators of FIGS. 10 and 11.

It is obvious, of course, that the baffles of the attenuators in FIGS. 9–11 may be apertured in the fashion of the attenuator in FIGS. 6 and 7 to effect attenuation of the circumferential pressure waves. The attenuator baffles in FIGS. 10 and 11 may also be tapered like those of the attenuator in FIG. 9 to increase the frequency band attenuation characteristics of the attenuators. The baffles may also be perforated to attenuate the circumferential pressure waves, as described earlier.

Numerous modifications in the design and arrangement of parts of the invention are obviously possible within its spirit and scope.

I claim:

1. An acoustic attenuator for use with a high speed, rotary fluid machine from which is exhausted a high velocity fluid stream containing a helical, axially advancing, acoustic pressure wave pattern including radially traveling pressure waves; said attenuator comprising:
    a rigid, generally tubular baffle structure having a central fluid passage to pass said fluid stream therethrough;
    said baffle structure comprising a plurality of rigid, radially directed baffles circumferentially spaced about and extending longitudinally of said passage and relatively flat, rigid outer walls joining adjacent baffles along their radially outer edges, each baffle including a relatively flat, rigid radially inner edge face and relatively flat, rigid radially directed side walls;
    the spaces between adjacent baffles being closed along their radially outer sides by said outer walls and being open along their radially inner sides to said fluid passage, and the circumferential width of the inner open sides of said spaces being substantially equal to the circumferential width of said inner baffle faces; and
    the radial dimension of at least some of said spaces at positions spaced therealong, measured radially between the outer wall of the respective space and the inner edge face of an adjacent baffle, being substantially equal to $n\lambda/4$ where $n$ is an odd integer and $\lambda$ is the predetermined wavelength of a radial pressure wave within said fluid stream.

2. The subject matter of claim 1 wherein:
    said baffles are hollow and open at their ends to permit said exhaust stream to flow therethrough.

3. The subject matter of claim 1 wherein:
    said outer walls of said baffle structure parallel and are located at a first uniform radial distance from the longitudinal axis of said passage and said inner baffle faces parallel and are located at a second uniform radial distance from said axis less than said first radial distance.

4. The subject matter of claim 1 wherein:
said outer walls of said baffle structure parallel and are located at a first uniform radial distance from the longitudinal axis of said passage and said inner baffle faces taper in toward said axis as the faces approach one end of said baffle structure, whereby the radial dimension of each space varies progressively therealong.

5. The subject matter of claim 1 wherein:
the radial dimensions of said baffles and spaces vary around said structure.

6. The subject matter of claim 1 wherein:
the radial dimensions of said spaces and baffles very non-uniformly around said baffle structure.

7. The subject matter of claim 1 wherein:
the radial dimensions of said spaces and baffles vary progressively around said baffle structure.

8. An acoustic attenuator for use with a high speed rotary fluid machine from which is exhausted a high velocity fluid stream containing a helical, axially advancing acoustic wave pattern including circumferentially traveling pressure waves; said attenuator comprising:
a rigid, generally tubular baffle structure having a central fluid passage to pass said fluid stream therethrough;
said baffle structure comprising a plurality of rigid, radially directed baffles circumferentially spaced about and extending longitudinally of said passage and relatively flat, rigid outer walls joining adjacent baffles along their radially outer edges, each baffle including a relatively flat, rigid radially inner edge face and relatively flat, rigid radially directed side walls;
those side walls of at least some of said baffles which face in one circumferential direction of said baffle structure having apertures which occupy approximately one half the total side wall area; and
the circumferential spacing between the side walls of each apertured baffle being substantially equal to $n\lambda/4$ where $n$ is an odd integer and $\lambda$ is the predetermined wavelength of a circumferential pressure wave in said fluid stream.

9. An acoustic attenuator for use with a high speed, rotary fluid machine from which is exhausted a high velocity fluid stream containing a helical, axially advancing, acoustic pressure wave pattern including radially and circumferentially traveling pressure waves; said attenuator comprising:
a rigid, generally tubular baffle structure having a central fluid passage to pass said fluid stream therethrough;
said baffle structure comprising a plurality of rigid, radially directed baffles circumferentially spaced about and extending longitudinally of said passage and relatively flat, rigid outer walls joining adjacent baffles along their radially outer edges, each baffle including a relatively flat, rigid radially inner edge face and relatively flat, rigid radially directed side walls;
the spaces between adjacent baffles being closed along their radially outer sides by said outer walls and being open along their radially inner sides to said fluid passage, and the circumferential width of the inner open sides of said spaces being substantially equal to the circumferential width of said inner baffle faces;
those side walls of at least some of said baffles which face in one circumferential direction of said baffle structure having apertures which occupy approximately one-half the total side wall area, and the spacing between the side walls of each apertured baffle being substantially equal to $n\lambda/4$, where $n$ is an odd integer and $\lambda$ is the predetermined wavelength of a circumferential pressure wave in said fluid stream; and
the radial dimension of at least some of said spaces at positions spaced therealong, measured radially between the outer wall of the respective space and the inner edge face of an adjacent baffle, being substantially equal to $n\lambda/4$ where $n$ is an odd integer and $\lambda$ is the predetermined wavelength of a radial pressure wave within said fluid stream.

10. In combination:
a high speed rotary fluid machine having an exhaust from which is discharged a high velocity fluid stream containing an axially advancing, helical acoustic pressure wave pattern including radially traveling pressure waves;
and an acoustic attenuator coupled to said exhaust including a substantially rigid, generally tubular baffle structure having a central fluid passage through which said exhaust stream flows;
said baffle structure comprising a plurality of rigid, radially directed baffles circumferentially spaced about and extending longitudinally of said passage and relatively flat, rigid outer walls joining adjacent baffles along their radially outer edges, each baffle including a relatively flat, rigid radially inner edge face and relatively flat, rigid radially directed side walls;
the spaces between adjacent baffles being closed along their radially outer sides by said outer walls and being open along their radially inner sides to said fluid passage, and the circumferential width of the inner open sides of said spaces being substantially equal to the circumferential width of said inner baffle faces; and
the radial dimension of at least some of said spaces at positions spaced therealong, measured radially between the outer wall of the respective space and the inner edge face of an adjacent baffle, being substantially equal to $n\lambda/4$ where $n$ is an odd integer and $\lambda$ is the predetermined wavelength of a radial pressure wave within said fluid stream.

References Cited in the file of this patent

UNITED STATES PATENTS

| | | |
|---|---|---|
| 2,225,398 | Hamblin | Dec. 17, 1940 |
| 2,544,284 | Stephens et al. | Mar. 6, 1951 |
| 2,660,858 | Lichty | Dec. 1, 1953 |
| 2,720,935 | Lysholm et al. | Oct. 18, 1955 |
| 2,807,931 | Bodine | Oct. 1, 1957 |
| 2,840,180 | Nobles et al. | June 24, 1958 |
| 2,841,237 | Slayter | July 1, 1958 |
| 2,853,147 | D'Eustachio | Sept. 23, 1958 |
| 3,041,836 | Truman et al. | July 3, 1962 |

FOREIGN PATENTS

| | | |
|---|---|---|
| 202,293 | Australia | July 5, 1956 |

OTHER REFERENCES

Publication "Flight," pp. 57–60, vol. 68, No. 2424, July 8, 1955.